Patented Dec. 16, 1941

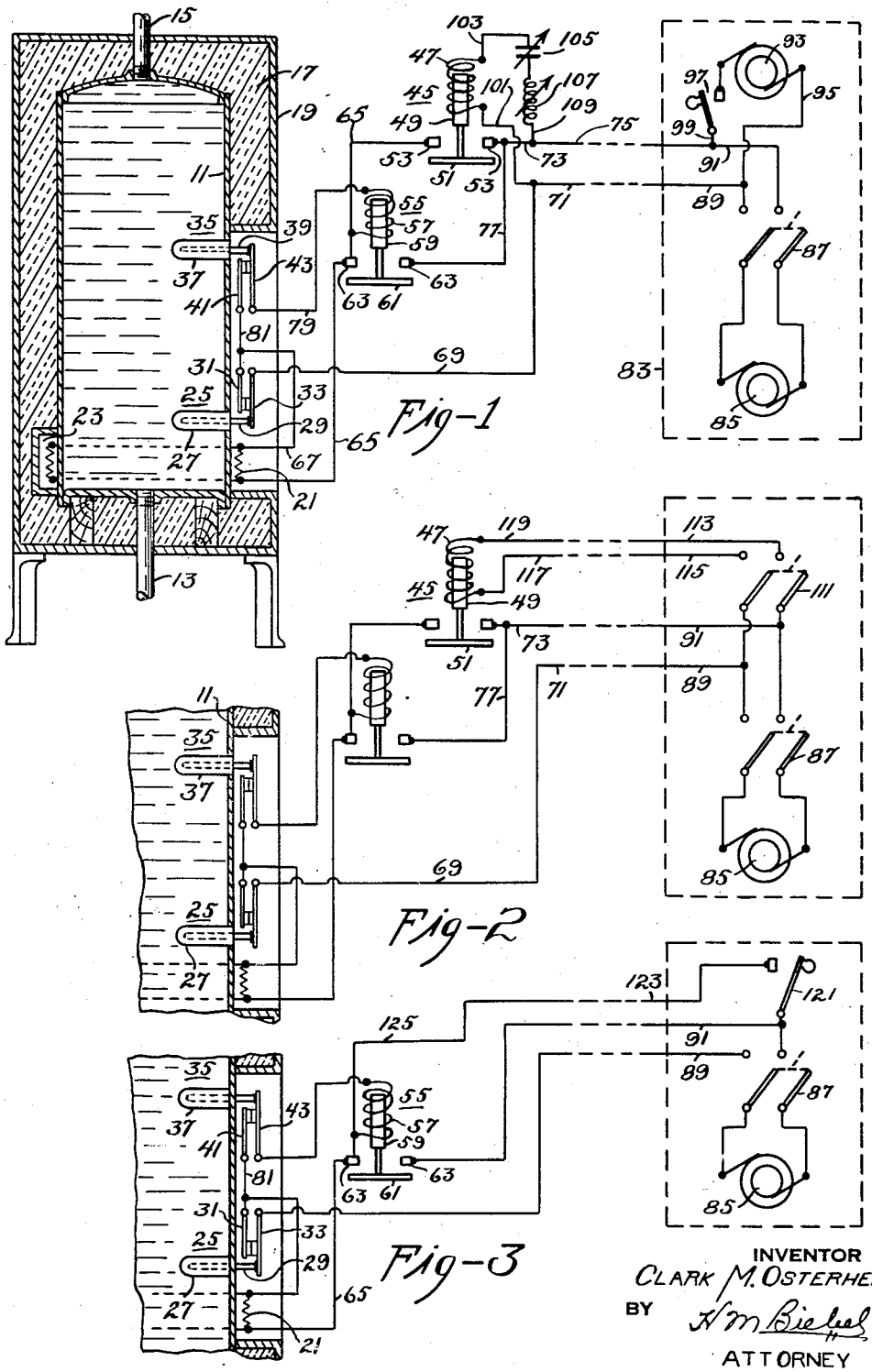

2,266,249

UNITED STATES PATENT OFFICE 2,266,249

WATER HEATING SYSTEM

Clark M. Osterheld, Stoughton, Wis., assignor to McGraw Electric Company, Elgin, Ill., a corporation of Delaware Application November 16, 1940, Serial No. 365,919

11 Claims. (Cl. 219—39)

My invention relates to electric water heating systems and particularly to all-day electric water heating systems.

An object of my invention is to provide a relatively simple and easily operable water heating system especially adapted to be used on domestic hot water tanks that shall start out the daytime part of a day with substantially a full tank of hot water and that shall permit of maintaining at least a predetermined fractional part of the water content of the tank at a desired relatively high temperature.

Another object of my invention is to provide a hot water heating system that shall be subject to remote control of an easily actuatable type.

Other objects of my invention will either be apparent from a description of several forms of systems embodying my invention or such objects will be set forth in the course of a description of my systems and particularly in the appended claims.

In the single sheet of drawings,

Fig. 1 is a schematic representation of a system embodying my invention shown as applied to an ordinary domestic hot water tank, Fig. 2 is a view similar to Fig. 1 but showing a somewhat different form of remote control for the system, and, Fig. 3 is a further modification of my improved system.

In many smaller urban communities the central station supplying electric current to its users in that community or district may desire to maintain a supply of electric energy particularly for hot water heating during the entire twenty-four hours of a day in contrast to the so-called "off-peak water heating systems." The operation and the results obtained by the use of my improved system will be evident from a description of several forms of control operatively related to and useable with my improved system.

Referring first of all to Fig. 1 of the drawing, I have there shown an ordinary hot water tank 11 which is provided with a cold water inlet pipe 13 at the bottom thereof and a hot water outlet pipe 15 at the top end thereof. I may also provide heat-insulating material 17 around the tank and an outer, preferably metal casing 19 in order to hold the heat-insulating material in its proper operative position around the tank. It is to be understood that while I have illustrated a specific embodiment of a hot water tank, my invention is not limited thereto and these details may be varied, it having been shown more particularly for illustrative purposes.

I provide an electric heater 21 which may be of substantially annular shape extending around the tank 11 and which may be positioned in a tunnel 23 of any suitable or desired structure. Reference may here be made to my Patent No. 2,226,526 issued December 24, 1940, for a type of heating element which may be used, although my invention is not to be considered as being limited thereto.

I provide a lower main thermally actuable switch 25 which, for illustrative purposes, is shown as comprising a tubular member 27 which is shown as connected in the wall of tank 11 at a relatively low point therein, the tubular member 27 to extend into the tank to be surrounded by the water near the bottom of the tank. The switch includes also an expansion rod 29, a relatively rigid contact bar 31 and a resilient contact bar 33 normally yieldingly biased into engagement with the rigid contact bar 31 but adapted to be moved out of engagement therewith by the expanded rod 29 when the thermally actuable switch 25 is responsive to the relatively high temperature of hot water. While I have shown specific positions of the main thermally actuable switch and of the heater, I do not desire to be limited thereto but desire only that the thermally actuable switch shall be effective to cause disengagement of contact bar 33 from contact bar 31 when substantially all of the water in the tank is hot.

I provide further an auxiliary thermally actuable switch 35 which is located in a different and preferably upper part of the tank and which comprises a tubular member 37, an expansion rod 39, a relatively rigid contact bar 41 and a resilient contact bar 43 which latter is normally yieldingly biased into engagement with contact bar 41 but is adapted to be moved out of engagement therewith when the tubular member 37 is surrounded by hot water.

While I have shown a specific position of the thermally actuable switch 35 at approximately half of the height of the tank, I do not desire to be limited thereto and may mount this thermally actuable switch at any desired point in the tank and subject it to the temperature of the water at that point in the tank. Generally then, instead of referring to a tank "half-full" of hot water, I use the expression "a predetermined fractional part of the water content is hot or cold" in order to refer to the relative quantity of hot or cold water in the tank.

I provide an electromagnetic switch 45 which includes a coil 47, a magnetizable core member 49, a contact bridging member 51 secured to the core 49 and a pair of relatively fixed contact members 53 engageable with and disengageable from the bridging member 51, all in a manner well known in the art.

I provide further a second electromagnetic switch 55 which includes a coil 57, a core member 59 having connected therewith a contact bridging member 61 and also a pair of fixed contact members 63 adapted to be engaged by bridging member 61.

One of the fixed contact members 53 is connected by a conductor 65 with one terminal of coil 57, with one of the fixed contact members 63 and with one terminal of the heater 21. The other terminal of heater 21 is connected by a conductor 67 with contact bar 31 while contact bar 33 is connected by a conductor 69 to a supply circuit conductor 71. The other fixed contact member 53 is connected by a conductor 73 with the other supply circuit conductor 75. A conductor 77 connects contact member 53 and the conductor 73 with the other fixed contact member 63. The other terminal of coil 57 is connected by a conductor 79 with contact bar 43 while contact bar 41 is connected by a conductor 81 with contact bar 31 and therefore with conductor 67.

I have illustrated generally only an electric supply station by the broken-line rectangular figure 83 and have also illustrated an alternating current generator 85 therein in the usual manner, which generator or source of electric current may be of any of the now well known kinds, such as a water wheel driven generator, a high speed turbine driven generator or it may be a rotary converter of the kind used in automatic electric sub-stations. A means for controlling the supply of electric energy from the generator or source 85 is illustrated generally by a manually actuable switch 87 and I have further illustrated, generally only, a set of bus bars 89 and 91 which are connected to the supply circuit and conductors 71 and 75 in the usual well known manner. I have shown broken-line connections between the power house ends of the bus bars 89 and 91 and the supply circuit conductors 71 and 75 to illustrate that these two parts are separated by some distance, all in accord with the present practice in this art.

I provide further in the generating station 83 a generator 93 which is adapted to generate relatively high frequency alternating current which may have a frequency on the order of several thousands alternations per second, all in a manner well known in the art. One terminal of the high frequency generator 93, which may be driven by any suitable or desired source of power, is connected by a conductor 95 to the bus bar 89 and therefore to the supply circuit conductor 71. I provide a switch 97 which is here shown, for example's sake, as a manually actuable single contact switch connected to the other side of the generator 93 and provide a conductor 99 connecting this switch to the bus bar 91 and therefore to the other supply circuit conductor 75.

The coil 47 of electromagnetic switch 45 is adapted to be energized from the high frequency generator 93 upon closure of the switch 97 by an operator in the central station or by any other means which may be considered desirable and in order to tune the coil 47 to respond to an energization of the high frequency current, I connect one terminal of the coil 47 through a conductor 101 to supply circuit conductor 71. The other terminal of coil 47 is connected by a conductor 103 to one terminal of an adjustable condensor 105, the other terminal of which is connected to one terminal of an adjustable reactance coil 107, the other terminal of which is connected by a conductor 109 to supply circuit conductor 75. The desired result obtained in the operation of this carrier frequency control is that while coil 47 is not responsive to the electric current of the ordinary frequency of say, 60 cycles, it will respond by suitable adjustment of the condensor 105 and the reactor 107 to the high frequency current when the switch 97 is closed.

Let it be assumed that as contemplated in the operation of my improved water heating system, the operator in the power house closed switch 97 at say 12 or 1 o'clock, and kept it in closed condition. Under these conditions the energized coil 47 would cause upward movement of core 49 and of the contact bridging member 51, which latter would engage the fixed contact members 53 and since the conductors 73 and 69 were connected responsively to supply circuit conductors 75 and 71 and therefore to the bus bars 91 and 89, an energizing circuit through the heater 21 would be established as follows: From supply circuit conductor 75, through conductor 73, through the engaged contact members 51 and 53, through conductor 65, through heater 21, through the engaged contact bars 31 and 33 and from there through conductor 69 to the supply circuit conductor 71 which, as above set forth, is continuously energized. It is, therefore, evident that unless the tank 11 is entirely filled with hot water at the time of the start of this continued energization of electromagnetic switch 45, current would flow through the heater 21 through the energizing circuit just above set forth and it is further evident that this energization would continue until substantially all of the water in the tank 11 is hot, which, of course, might occur at any time after energization of the heater having been effected, in accordance with the quantity of hot water in the tank at the start of this continued energization. The off-peak period as usually understood, is that part of a twenty-four hour day extending from 10:00 p. m. to 6:00 a. m., or of any other duration of a time when the ordinary demands for current may be relatively light and since a large part of the load on a central station distributing system consists of residence lighting, the off-peak period will usually be found to occur during the later part of the night.

As above stated, deenergization of the heater 21 of any one installation will occur when all of the water in the tank is hot and it is relatively easy for the engineers of a central station to determine, at least generally, when it is desirable for the central station operator to start the continuing closure of the control element 45 with resultant heating of the water, this latter continuing until all of the water in the tank is hot unless, of course, the operator opens switch 97 to interrupt energization of the heater 21 irrespective of whether all of the water in the tank is hot.

My improved system as embodied in the diagram shown in Fig. 1 of the drawing is effective to maintain a predetermined fractional part of the water content of the tank hot during the daytime and how this may be easily and quickly accomplished by momentary closures of the switch 97 at any desired spaced times of the day will now be described.

Let it be assumed, for more clearly setting forth the operation of my system, that at say 10:00 a. m., earlier withdrawals of hot water from the tank resulted in the upper auxiliary thermally actuable switch 35 being subject to cold water, that is, less than said predetermined fractional part of the water content of the tank is hot at that time. Momentary closure of switch 97 will close an energizing circuit through coil 57 of the electromagnetic switch 55, as follows: From supply circuit conductor 75 through conductor 73, through engaged contact members 53 and 51, through a part of conductor 65, through coil 57, through conductor 79, through engaged contact bars 43 and 41, through conductor 81, through engaged contact bars 31 and 33 and from there through conductor 69 to the other energized supply circuit conductor 71. Under the conditions set forth above, that auxiliary switch 35 was subject to cold water, contact bars 43 and 41 would be in engagement with each other and it is further evident that contact bars 33 and 31 would also be in engagement with each other since the lower, main thermally actuable switch 25 would be subject to cold water if the upper auxiliary thermal switch is subject to cold water.

The energized coil 57 would cause upward movement of core 59 and contact bridging member 61 and a heater energizing circuit would be established as follows: From supply circuit conductor 75 through conductors 73 and 77, through engaged contact members 63 and 61, through conductor 65 through the heater 21, through conductor 67, through engaged contact arms 31 and 33 and from there through conductor 69 to the other energized supply circuit conductor 71. At the same time a holding circuit for the coil 57 would be established as follows: From supply circuit conductor 75 through conductors 73 and 77, through engaged contact members 63 and 61, through coil 57, through conductor 79, through engaged contact bars 43 and 41, conductor 81, engaged contact bars 31 and 33 and from there through conductor 69 to the other supply circuit conductor 71. It is, therefore, evident that momentary closure of control switch 47 will result in establishing and maintaining a heater energizing circuit in case the amount of hot water in the tank is less than enough to subject the auxiliary thermal switch 35 to it. This heater energizing circuit, established by momentary application of any suitable form of electric energy to the control element 47, therefore results in a continuing energization of the heater 21 if less than a predetermined fractional part of the water content of the tank is hot, such energization of the heater continuing until the auxiliary thermal switch 35 is subject to water having a predetermined relatively high temperature at which time contact bar 43 will be moved out of engagement with contact bar 41 to thereby interrupt the holding circuit of the coil 57 and with resultant deenergization of the heater 21.

It is therefore evident that my improved all-day water heating system will permit of relatively simple and easy central station control for predetermined and different durations of time in any suitable or desired manner to start out the daytime use of hot water with a tank which is either full of hot water or almost so, depending, of course, upon the condition in which it was at the time of start of continued energization at about midnight, and during the rest of the daytime and into the early evening, my improved system ensures that a predetermined fractional part of the water content of the tank is hot.

While Fig. 1 of the drawing shows a remote control system operating on the carrier current system, I may use a somewhat similar system which I here designate only as wired radio it being only necessary that the above described results of energization and deenergization of the control element 45 is effected.

I have shown another method of control of the control element 45 of my improved water heating system as embodying a secondary distribution system which is shown as including an auxiliary manually operable control switch 111 in the power house 83, this switch being adapted to energize and deenergize a distribution circuit illustrated generally as including conductors 113 and 115 which are entirely separate from the other supply circuit distribution system as described above in connection with Fig. 1 of the drawing. One terminal of coil 47 is connected by a conductor 117 with the conductor 115 and the other terminal of coil 47 by a conductor 119 to conductor 113. The coil 47 of the control element 45 is therefore adapted to be energized by the usual 60 cycle current or its equivalent, as now provided on alternating current distribution systems.

When the operator closes switch 111 momentarily he will effect the same result as was described hereinbefore for the system of Fig. 1 of the drawing, namely, an energization of the heater 21 in case the tank contains less than a predetermined fractional part of hot water, and it is, of course, further evident that not only the system of Fig. 2 but also in the system of Fig. 1 momentary closure of the switch 111 and momentary energization of the control element 45 will not affect continuing energization of the heater 21 in case the upper thermal switch 35 is responsive to the temperature of hot water. In all other details the operation of the system shown in Fig. 2 of the drawing is the same as that set forth in connection with the system of Fig. 1.

Referring now to Fig. 3 of the drawing, I have there shown another system embodying my invention, in which the momentary and continued energization of the control system is effected by relatively simple means. I provide a manually actuable switch 121 in the central station 83 here shown as a single pole knife blade switch having one terminal connected to bus bar 91 and having its other terminal connected by a conductor 123 to conductor 125 in the control system at the hot water tank, the other end of conductor 125 being connected to conductor 65 and to one of the fixed contact members 63.

The switch 121 will operate in the same manner as does the control element 45, whereby momentary and continued closure of the switch 121 effects energization of the heater 21 in the same manner as set forth above for the control systems of Figs. 1 and 2.

The systems here disclosed and embodying my invention are therefore effective to start out the daytime with the tank practically or entirely full of hot water and further to maintain at least a predetermined fractional part of the water content of the tank hot during the day, it being only necessary for the operator to manually momentarily close his control switch 97, 111 or

121 at spaced instants of time during the day and then to close this control switch at any desired time during the off-peak period, which time will be as late as will ensure heating of all the water in the tank before the end of the off-peak period. This, of course, is desirable since, usually, the off-peak period has a decided dip therein during some of the late night or early morning hours and it is, of course, of importance to the central station to fill out this "valley" in the curve to thereby maintain a higher efficiency of current generation, all as now well understood in the art.

Various other modifications may be made in the systems embodying my invention without departing from the spirit or scope thereof and all such modifications clearly coming within the scope of the appended claims are to be considered as being covered thereby.

I claim as my invention:

1. A water heating system for a hot water tank having an electric heater, comprising a main thermally actuable heater-control switch subject to the temperature of the water in the lower part of the tank and adapted to be held in closed position until substantially all of the water in the tank is hot, a second heater-control switch in series circuit relation to the main heater-control switch, a thermally actuable switch responsive to the temperature of the water in an upper part of the tank and switching means jointly effective with said thermally actuable switch to cause closure of said second heater-control switch and energization of the electric heater by momentary energization of said switching means in case the thermally actuable switch is responsive to a water temperature of less than a predetermined value.

2. A water heating system for a hot water tank having an electric heater, comprising an electromagnetic heater control switch, a thermal switch subject to tank water temperature at an intermediate part of the tank and connected to control said electromagnetic switch, a second heater control switch and connections between said heater and said switches to cause momentary closure of said second heater control switch at a time when said thermal switch is subject to cold water to effect energization of said heater through said electromagnetic switch until said thermal switch is subject to hot water and to cause continued closure of said second heater control switch when said thermal switch is subject to hot water to effect energization of said heater through said second heater control switch alone until substantially all of the water in the tank is hot.

3. A water heating system for a hot water tank having an electric heater, comprising an electromagnetic heater control switch, a thermally-responsive switch located at a predetermined upper part of the tank and held in closed position when its ambient water temperature is below a certain value, a second electromagnetic switch the contacts of which are connected in shunt circuit relation to those of the first named electromagnetic switch, means controlling the energization of said first electromagnetic switch and electric connections between said switches whereby momentary energization of the first electromagnetic switch at a time when the ambient water temperature of the thermally-responsive switch is below said certain value causes closure of said second named electromagnetic switch and energization of the heater until the ambient water temperature of the thermally-responsive switch is above said certain value.

4. A water heating system for a hot water tank having an electric heater, comprising an electromagnetic heater control switch, a thermally-responsive switch located at a predetermined upper part of the tank and held in closed position when its ambient water temperature is below a certain value, a second electromagnetic switch the contacts of which are connected in shunt circuit relation to those of said first named electromagnetic switch, remotely located means controlling the energization of said first electromagnetic switch and electric connections between said switches whereby energization of said remotely located control means to cause continuing closure of said first electromagnetic switch effects continuing energization of said heater irrespective of the ambient water temperature affecting said thermally-responsive switch.

5. The method of maintaining a predetermined quantity of hot water in a tank subject to withdrawals of varying quantities of hot water therefrom at different times of the day, which method comprises momentary energization of a heater-control system for the tank at desired spaced times of the day to cause energization of an electric heater for the tank in case the tank contains less than said predetermined quantity of hot water and continuation of said heater energization until the tank does contain said predetermined quantity of hot water.

6. A water heating system for a hot water tank having an electric heater, comprising a control means, a main heater-energizing circuit including said control means responsive to continued energization of said control means to cause energization of the heater and continuance of the energization until substantially all of the water in the tank is hot and an auxiliary heater energizing circuit responsive to momentary energization of said control means to cause energization of the heater in case the tank is less than approximately half full of hot water, said energization continuing until the tank is approximately half full of hot water.

7. A system as claimed in claim 4 and including a second thermally actuable switch electrically connected in series circuit relation with the first named electromagnetic heater control switch, effective to cause deenergization of the electric heater when substantially all of the water in the tank is hot.

8. A water heating system for a hot water tank having an electric heater, comprising an electromagnetic switch, an auxiliary electromagnetic switch electrically connected in shunt with said first named electromagnetic switch, a main thermally actuable switch so positioned in the tank that it is moved to open position when substantially all of the water in the tank is hot, a second thermally actuable switch so positioned in the tank that it is moved to open position when a predetermined fractional part of the water in the tank is hot, and electric connections between all of said switches, momentary energization of said first electromagnetic switch causing energization of the heater through said second electromagnetic switch and said main thermally actuable switch until substantially said predetermined fractional part of the water in the tank is hot and continued energization of said first electromagnetic switch causing energization of the heater through said first electromagnetic switch and said main thermally actuable switch until substantially all of the water in the tank is hot.

9. A water heating system for a hot water tank having an electric heater, comprising a main and an auxiliary thermal switch subject to tank water temperature at different heights of the tank, an electromagnetic heater control switch, a fourth switch and electric circuit connections between the heater and all of said switches to cause momentary closure of said fourth switch to effect continuing energization of the heater through the electromagnetic switch and the main thermal switch in case less than a predetermined fractional part of the water content of the tank is hot at the time of said momentary closure of said fourth switch and to cause continued closure of said fourth switch to effect energization of the heater through the main thermal switch only.

10. The method of maintaining different predetermined quantities of hot water in a tank subject to withdrawals of varying quantities of hot water therefrom at different times of day, said tank having an electric heater and a control system for said heater, said method comprising the step of momentarily energizing the heater control system at different spaced times of day to cause energization of the electric heater in case less than a predetermined fractional part of the water content of the tank is hot and the step of continuously energizing the heater control system at another part of day to cause energization of the electric heater in case less than all of the water content of the tank is hot.

11. A water heating system for a hot water tank having an electric heater and subject to withdrawals of hot water therefrom at different times during a twenty-four hour day, comprising a main thermal heater control switch adapted to cause deenergization of the heater when substantially all of the water in the tank is hot, an auxiliary thermal switch responsive to tank water temperature at an intermediate point of the tank, an electromagnetic heater control switch, remotely energizable control means for said electromagnetic switch, a second electromagnetic heater control switch and electric connections between said switches and the heater to tend to maintain in a heated condition a predetermined fractional part of the water content of the tank during a predetermined part of a twenty-four hour day by energization of the heater through a circuit including the second electromagnetic switch and the main thermal switch, and to tend to maintain in a heated condition all of the water content of the tank during another part of a twenty-four hour day by energization of the heater through a circuit including said first named electromagnetic switch and said main thermal switch.

CLARK M. OSTERHELD.